US011523626B2

(12) United States Patent
Valenzuela Roediger et al.

(10) Patent No.: US 11,523,626 B2
(45) Date of Patent: Dec. 13, 2022

(54) SYNERGIC COMPOSITION FOR KEEPING FISH AND SEAFOOD FRESH

(71) Applicants: PONTIFICIA UNIVERSIDAD CATOLICA DE CHILE, Santiago (CL); FUNDACION COPEC-UNIVERSIDAD CATOLICA, Macul (CL)

(72) Inventors: Loreto Margarita Valenzuela Roediger, Providencia (CL); Jose Oscar Cuevas Valenzuela, Talca (CL); Wendy Veronica Franco Melazzani, Providencia (CL); Jose Ricardo Perez Correa, San Jose de Maipo (CL)

(73) Assignees: PONTIFICIA UNIVERSIDAD CATOLICA DE CHILE, Santiago (CL); FUNDACION COPEC-UNIVERSIDAD CATOLICA, Macul (CL)

( * ) Notice: Subject to any disclaimer, the term of this patent is extended or adjusted under 35 U.S.C. 154(b) by 0 days.

(21) Appl. No.: 17/046,613

(22) PCT Filed: Apr. 13, 2018

(86) PCT No.: PCT/CL2018/050018
§ 371 (c)(1),
(2) Date: Oct. 9, 2020

(87) PCT Pub. No.: WO2019/195952
PCT Pub. Date: Oct. 17, 2019

(65) Prior Publication Data
US 2021/0100267 A1  Apr. 8, 2021

(51) Int. Cl.
 A23L 3/3472 (2006.01)
 A23B 4/10 (2006.01)
 A23L 3/3562 (2006.01)
(52) U.S. Cl.
 CPC .............. A23L 3/3472 (2013.01); A23B 4/10 (2013.01); A23L 3/3562 (2013.01)
(58) Field of Classification Search
 CPC ........ A23L 3/3472; A23L 3/3562; A23B 4/10
 USPC ........................................................ 426/542
 See application file for complete search history.

(56) References Cited

PUBLICATIONS

Wu et al., Properties and antimicrobial activity of silver carp (*Hypophthalmichthys molitrix*) skin gelatin-chitosan films incorporated with oregano essential oil for fish preservation, Food Packaging and Shelf Life, vol. 2, Issue 1, Sep. 2014, pp. 7-16. (Year: 2014).*
Alves et al., Preparation and characterization of a chitosan film with grape seed extractcarvacrol microcapsules and its effect on the shelf-life of refrigerated Salmon (*iSalmo salar*), LWT, vol. 89, Mar. 2018, pp. 525-534. (Year: 2018).*
Benavides et al., "Development of alginate microspheres containing thyme essential oil using ionic gelation", Food Chemistry, 2016, 204, pp. 77-83.

(Continued)

*Primary Examiner* — Brent T O'Hern
(74) *Attorney, Agent, or Firm* — Raphael Bellum PLLC

(57) ABSTRACT

The present invention is a composition that can form an edible film or an edible liquid coating that can be applied to the surface of fresh fish (fillets or cuts) or fresh seafood. The present invention acts as a physical barrier preventing oxygen, water and microorganisms from entering the food product, and also acts as a bacteriostatic and antioxidant agent.

15 Claims, 7 Drawing Sheets

(56) References Cited

PUBLICATIONS

Camara, Sara "Peliculas de quitosano con eugenol encapsulado en microesfera de alginato. Grado en Ciencia y Tecnologia d los Alimentos", Univesitat Politecnica de Valencia, 2017, with English abstract on p. 3.

Hosseini et al., "Bio-based composite edible films containing *Origanum vulgare* L. essential oil", Industrial Crops and Products 67, 2015, pp. 403-413.

Palma et al., "Near-infrared chemical imaging and its correlation with the mechanical properties of chitosan-gelatin edible films", Carbohydrate Polymers, 136, 2016, pp. 409-417.

Vera et al., "Preparation and characterization of a chitosan film with grape seed extract-carvacrol microcapsules and its effect on the shelf-life of refrigerated salmon (*Salmo salar*)", LWT—Food Science and Technology, 89, 2018; pp. 525-534.

Wu et al., "Properties and antimicrobial activity of silver carp (*Hypophthalmichthys molitrix*) skin gelatin-chitosan films incorporated with oregano essential oil for fish preservation", Food Packing and Shelf Life, 2014, pp. 7-16.

\* cited by examiner

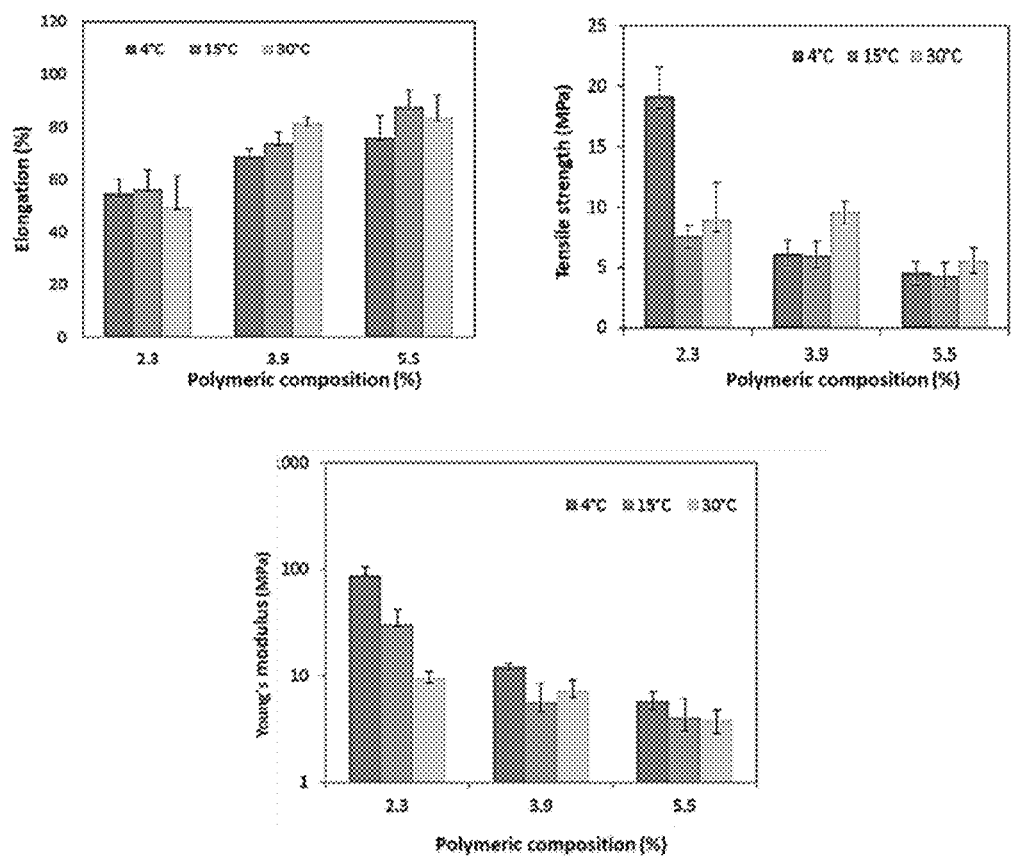
Figure 1.1

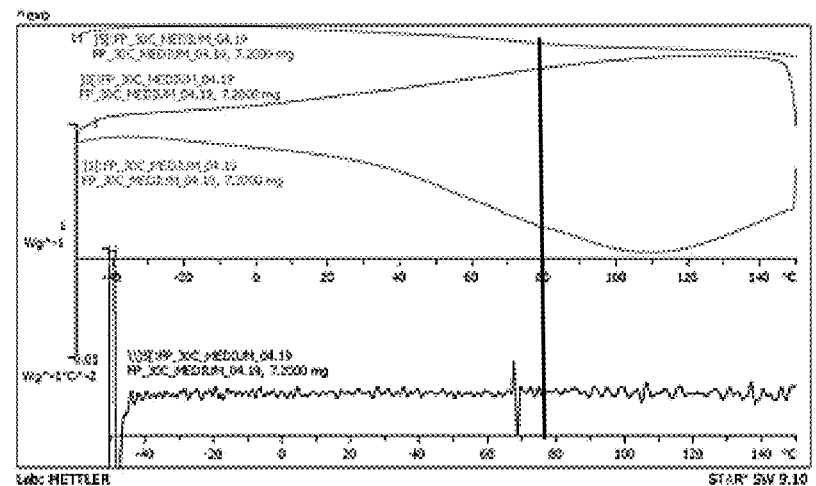
Figure 1.2
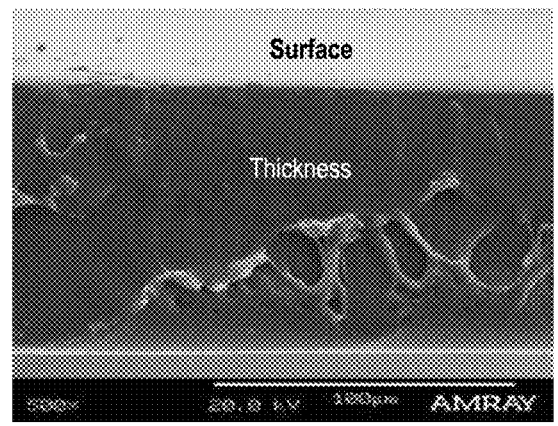
Figure 1.3

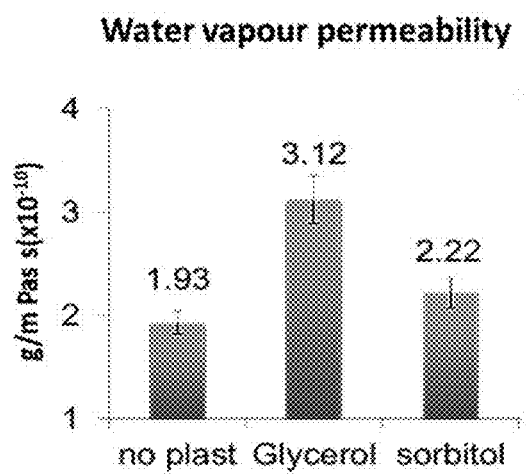
Figure 1.4
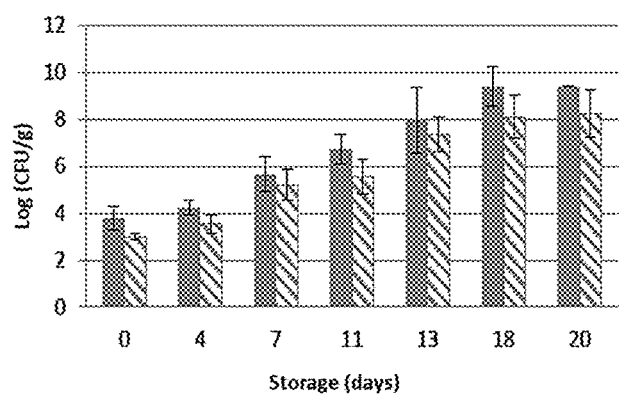
Figure 2.1

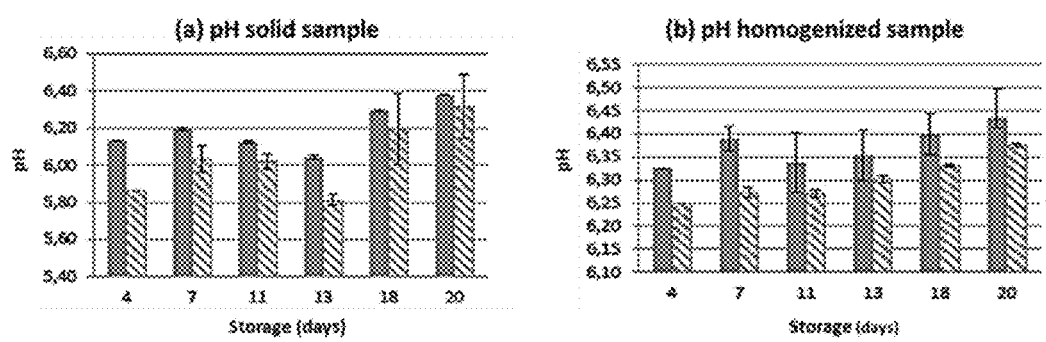
Figure 2.2

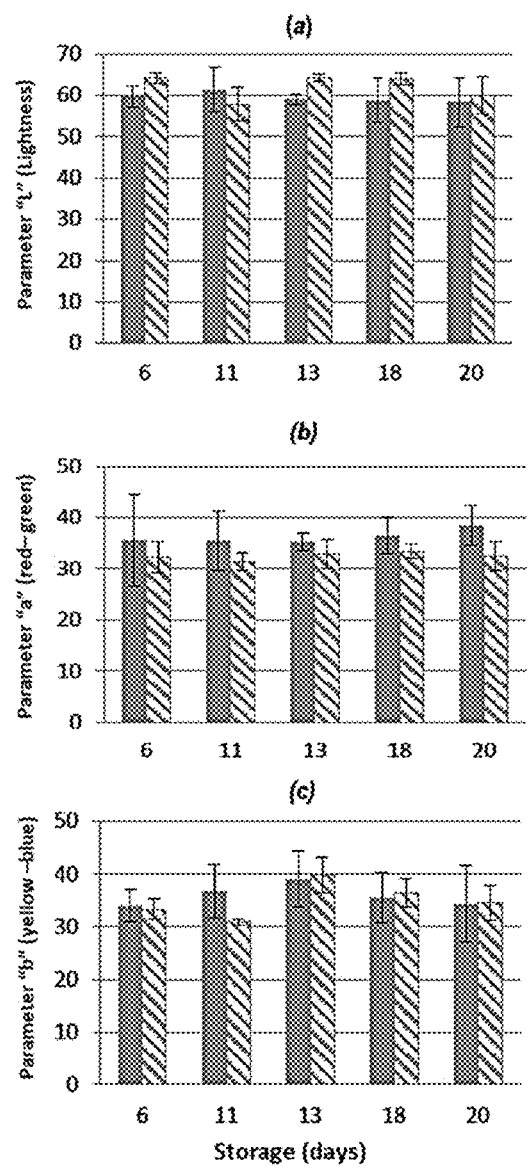
Figure 2.3

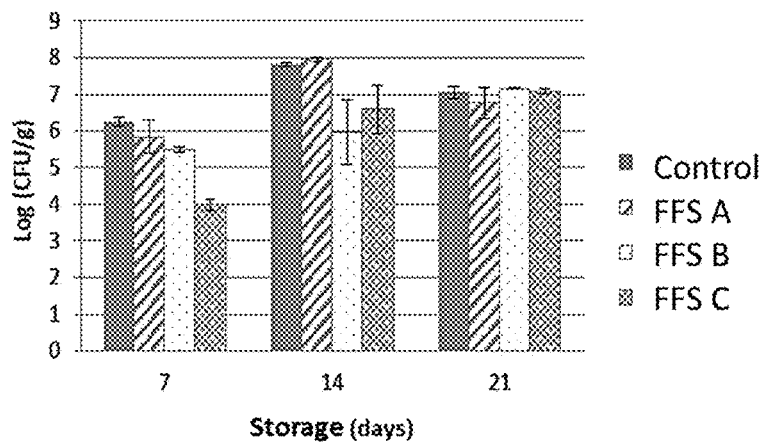
Figure 3.1
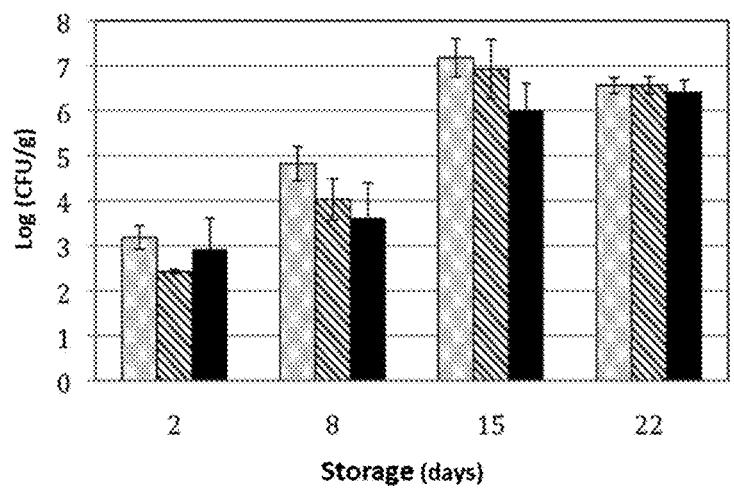
Figure 3.2

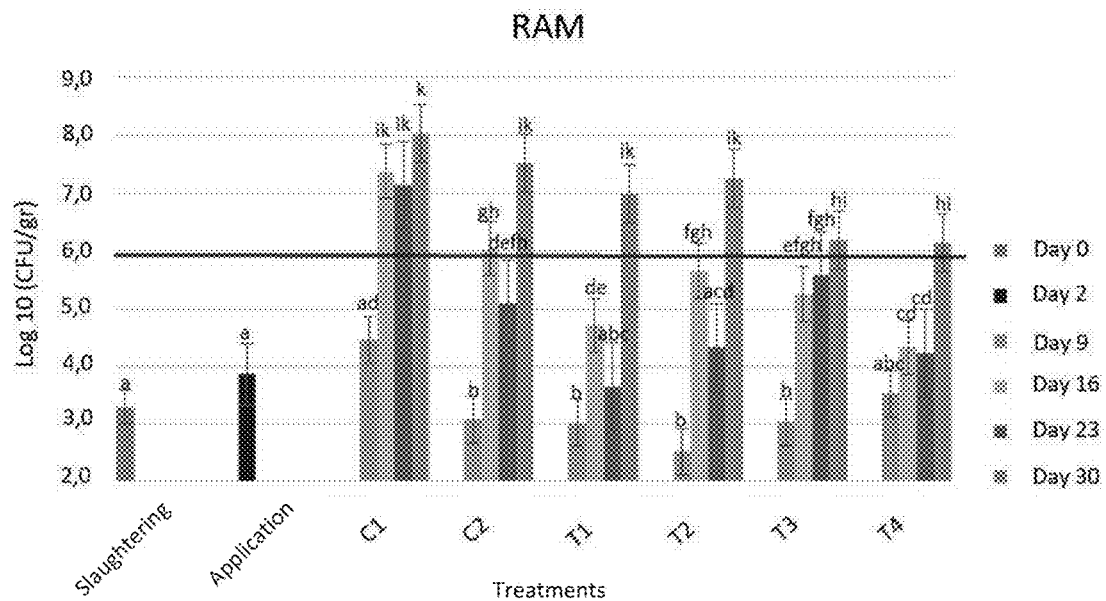
Figure 4.1
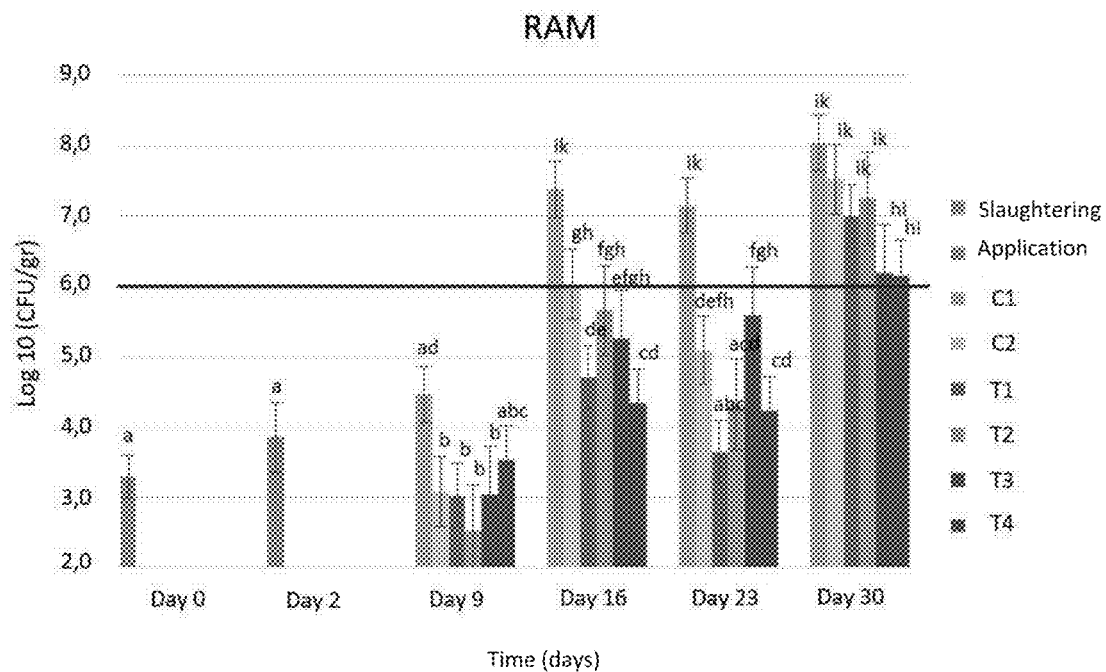
Figure 4.2

SYNERGIC COMPOSITION FOR KEEPING FISH AND SEAFOOD FRESH

TECHNICAL FIELD

The present invention can be applied in the field of food processing, more particularly for preserving fresh fish and seafood.

BACKGROUND ART

In general, consumers tend to prefer fresh fish or fresh seafood over frozen alternatives or processed alternatives, such canned or smoked fish. Nevertheless, transport and commercialization time and limited shelf-life of fresh food reduces competitiveness in different markets. For example, fresh salmon fillets produced in Chile, obtained from fish grown in aquaculture systems, have a shelf-life of 13-15 days at most, which strongly restricts its commercialization in other markets, such as Europe or USA, since air transport must be used.

In the case of Chilean mussels, these can only be commercialized as canned or frozen, since their shelf-life is no longer than 7 days. On the other hand, fresh fish and seafood must compete in high-demand periods against other food products in terms of exporting logistics and transportation.

Shelf-life of a food product is given by its chemical, physical, and biological quality. Food spoilage occurs mainly due to microorganism growth, lipid oxidation, and changes in pH, color, aroma, and texture. In the case of fish and seafood, the most important factors in spoilage are microbial growth and lipid oxidation by oxygen and enzymes. To extend shelf-life and thus preserve the quality of fish and seafood, said factors must be kept under control so that the original properties of the product are maintained in the best possible manner over time. The present invention is directed to solve this issue by producing a physical barrier to oxygen and water, and to stop or reduce and decrease microbial growth rate by the controlled release of natural origin compounds.

The current main competing technologies are vacuum packaging (VP) and modified atmosphere packaging (MAP), since both are used with the aim of considerably extending shelf-life of fresh fish and seafood during transport and commercialization. Nevertheless, there is a serious problem with the use of VP and MAP: the potential to allow growth of anaerobic bacteria *Clostridium botulinum* type E (resistant at low temperatures) that can produce outgrowth and toxins in the packed product. Also, its application can generate an unusual aroma and loss of color and texture in the packed product. Finally, the application of VP and MAP on large scale is highly restricted due to packaging, storage, and transport costs, which are related to the greater volume that products packed using these technologies present. These issues are not present when using this invention, which translates into a relevant comparative advantage over said technologies.

To maximize its effect, the composition of the present invention must be applied during the processing of fresh fish and seafood, i.e. in a production plant before the packaging and further distribution. Therefore, potential clients and users of the present invention are all those producing, processing, and/or distributing fresh fish or seafood in the world. Chile ranks 15th for worldwide production of seafood; Chile's main exporting industries, specifically salmon and mussels, therefore represent an interesting segment. The formulation of the present invention, the synergy among its components, processes for its production, and the techniques for its use and application, represent a whole, novel, comprehensive, and cost-effective solution for the fresh fish and seafood industry.

A search on patent databases was conducted to assure the merits of this invention; in the following paragraphs, the closest documents found are described and compared to our invention.

WO2005018322A1 describes a material containing encapsulated antimicrobial agents. The specification mentions the use of carvacrol and thyme as antimicrobial agents. This document also mentions the use of alginate, gelatin, and chitosan as encapsulating polymers for the active agents. There is no mention about combining encapsulated and free active agents.

WO2006127494A2 describes an ingredient release system in an edible product. It is specifically directed to a chewing gum, and it describes encapsulated ingredients to produce the controlled release in different steps. The document mentions carvacrol, thyme and chitosan; nevertheless, the technical field is completely different, since no preservation or antimicrobial activity is sought with the use of carvacrol or thyme.

US2016000094A1 describes a broad spectrum antimicrobial composition. The components are, among many others, carvacrol and thyme oil, and thickeners. Nevertheless, not all the components described in the present invention are included, and a suggestion of synergy among specific components is not present.

US2007042184A1 describes edible microcapsules containing antimicrobial agents, and among the antimicrobial agents, carvacrol and thyme are mentioned as active ingredients, without mentioning application in food related products.

BRIEF DESCRIPTION OF FIGURES

FIG. 1.1. Variation of the mechanical properties (Tensile strength, Elongation and Young module) of the edible films with its polymer composition of chitosan/glycerol+gelatin (2.3% corresponds to the low level of concentrations, 3.9% to the medium level and 5.5% to the high level) for different drying temperatures.

FIG. 1.2. Thermogram corresponding to the edible film manufactured with a medium level of concentrations of polymers and plasticizers and dried at 30° C. It shows the evolution of the specific heat flow (in W/g) in function of temperature (° C.). In particular, the superior line shows what occurs with the dry film.

FIG. 1.3. Image obtained by Scanning Electron Microscopy (SEM) for the film manufactured with a medium level of concentrations of polymers and plasticizers and dried at 30° C.

FIG. 1.4: Water vapor permeability (in g/(m Pa s)) of the films manufactured with different plasticizers. No plastic refers to a film manufactured without plasticizer. The results corresponding to the plasticizers mixtures are not included since they present non-suitable permeabilities for manufacturing films.

FIG. 2.1. Variation of the relative number of microorganisms (measured in CFU/g of fish) in function of the day of storage in uncoated fillets (control, solid bar) and coated fillets (Film forming solution (FFS), basal formulation with 0.8% in dry weight of thyme essential oil (TEO) hatched bar). The lines over each bar represent the confidence intervals at 95% of the average values of log (CFU/g) for each day.

FIG. 2.2. Variation of the pH in function of the day of storage of: (a) solid samples of uncoated fillets (control, filled bar) and coated fillets (FFS, basal formulation with 0.8% in dry weight of TEO; hatched bar); and (b) samples homogenized with water Milli-Q of the same fillets. Lines over each bar represent the confidence intervals at 95% of the average values of pH.

FIG. 2.3. Variation of the color of uncoated fillets (control, filled bar) and coated fillets (FFS, basal formulation with 0.8% in dry weight of TEO; hatched bar) in function of the day of storage. It is represented as the change in the value of three parameters: (a) L*, which indicates brightness; (b) a*, which indicates intensity in the red-green range; and (c) b*, which indicates intensity in the yellow-blue range. Lines over each bar represent the confidence intervals at 95 of the average values of the parameter.

FIG. 3.1. Variation of the relative number of microorganisms (measured in CFU/g of fish) in function of the day of storage in uncoated fillets (control) and coated fillets (FFS A: 2.5% of TEO+600 ppm of pure carvacrol; FFS B: 2.5% of TEO+300 ppm of carvacrol+300 ppm of pure thymol; FFS C: 2.5% of TEO+600 ppm of pure carvacrol+300 ppm of thymol). Lines over each bar represent the confidence intervals at 95% of the average values of log (CFU/g) for each day.

FIG. 3.2. Variation of the relative number of microorganisms (measured in CFU/g of meet) in function of the day of storage of uncoated fresh salmon fillets (control, dotted bar), with coating applied by aspersion (hatched bar) and with coating applied by bath (filled bar). Lines over each bar represent the confidence intervals at 95% of the average values of log (CFU/g) for each day. The slaughtering and application day of the coating corresponds to the day 0.

FIG. 4.1: Variation of the relative number of microorganisms (measured in CFU/g of salmon) with each treatment. Error bars represent the confidence intervals at 95% of the average values of log (CFU/g) for each day (p-value: 0.021).

FIG. 4.2: Variation of the relative number of microorganisms (measured in CFU/g of salmon) at different days. Error bars represent the confidence intervals at 95% of the average values of log (CFU/g) for each day (p-value: 0.0122).

SUMMARY OF THE INVENTION

The present invention is a composition that can form an edible film or an edible liquid coating that can be applied to the surface of fresh fish (fillets or cuts) or fresh seafood.

DETAILED DESCRIPTION OF THE INVENTION

The present invention acts as a physical barrier preventing oxygen, water and microorganisms from entering the food product, and also acts as a bacteriostatic and antioxidant agent. The latter effect is due to the release of active compounds of the present invention. Thus, the present invention preserves physical and organoleptic properties and therefore, improves the quality of fresh fish or seafood.

The composition of the present invention comprises:
  i. a film-forming solution, comprising chitosan, gelatin, a plasticizer, a surfactant;
  ii. active agents selected among: thyme essential oil; oregano essential oil; rosemary essential oil; carvacrol; thymol; p-cymene; cinnamaldehyde; cineol; eugenol, wherein the active agents are present as free active agents and/or particles of encapsulated active agents. This combination allows an instant action because of the initial release of free active agents, followed by a delayed action due to the release of encapsulated active agents.

In a particular embodiment, the particles of encapsulated active agent have an average size from 150 µm to 450 µm.

In a further embodiment, chitosan is present in a concentration from 1.0% w/w to 3.0% w/w.

In a further embodiment, gelatin is present in a concentration from 1.5% w/w to 3.5% w/w.

In a further embodiment, active agents such as essential oils are present in a concentration from 0.05% w/w to 4.0% w/w. In a specific embodiment, thyme essential oil is present in a concentration from 0.05% w/w to 4.0% w/w.

In a further embodiment, free active agents are present in a concentration from 0.15% w/w to 1.5% w/w. In a specific embodiment, free carvacrol is present in a concentration from 0.15% w/w to 1.5% w/w.

In a further embodiment, encapsulated active agents are present in a concentration from 0.15 w/w to 8.5% w/w. In a specific embodiment, encapsulated carvacrol is present in a concentration from 0.15% w/w to 1.0% w/w.

In a different aspect of the present invention, the encapsulated active agents can be encapsulated using various techniques and reactants. In a particular embodiment, the encapsulation is performed using ionic gelling. In a different embodiment, the encapsulation can be performed using physical, physico-chemical, or chemical techniques.

In a further aspect of the present invention, the film-forming solution comprises 1-5% w/w chitosan, 1-5% w/w gelatin. Optionally, the film-forming solution further comprises a plasticizer. In a more specific embodiment, the plasticizer is 1-5% w/w sorbitol or 1-5% w/w glycerol.

In a further embodiment, the film-forming solution preparation method is performed by dissolving chitosan in 1% v/v acetic acid, up to a final preferred concentration of 1-5% w/w. This solution is further mixed with 1-5% w/w gelatin. Finally, 0.5-5% w/w sorbitol is added as a plasticizer. The solution is continuously stirred until reaching complete dissolution, and then is heated up to a temperature from 30° C. to 55° C., for a period of time from 30 minutes to 4 hours, under continuous stirring; it produces a film-forming solution ready to be used as a base to produce the bioactive coating of the present invention. Active ingredients, either as free active agents or as encapsulated active agents, are added to the film-forming solution base, producing the bioactive film-forming solution of the present invention.

In a further embodiment, the film-forming solution preparation method comprises a further step, wherein a thin layer of the film-forming solution ready to be used as bioactive coating is placed on a surface and dried at a temperature from 30° C. to 60° C., for a period of time from 6 hours to 76 hours, until a film is obtained.

In a further aspect of the invention, the bioactive film-forming solution can be used directly as a coating solution. In a different embodiment, the bioactive film-forming solution can be applied as a spray, as a bath, or any other method that would allow the product to be protected by completely coating the food piece.

In a different embodiment, when the bioactive film-forming solution is further dried as described in the following instructions, the obtained film can be used as a coating film.

Surprisingly, the combination of these specific components resulted in an unexpected synergic effect, wherein the combined effect is 10 times better in reducing microbial growth than the sum of individual effects. The data to support this claim is shown in the Examples that compare the antimicrobial effect of each component of the composition separately, and combined.

The inventors found that fresh salmon maintains a low microbial concentration on its surface for up to 26 days after harvest. In addition, assays performed by the inventors, as well as results presented in the literature, show that salmon shelf-life without treatment can reach 16 days maximum.

The surprising synergic effect of the components of the present invention provides an advantage that is not obvious from the prior art. The composition of the present invention has been evaluated at laboratory scale with fresh refrigerated salmon fillets. The technical scaling feasibility has been evaluated with good results. Therefore, the present invention can be flexible enough to adapt to different scales of production demand, in order to supply market requirements.

The composition of the present invention can be applied as a solid film or a liquid coating directly in the production lines of seafood processing plants, before the final packaging stage. Particularly, the composition of the present invention can be applied as a coating using spraying systems, in both sides of the fish, and dried with no further intervention in the production line.

EXAMPLES

The following examples demonstrate the functioning of the invention, and should be considered as an illustration for preparation and functioning of the invention, and as such, should not be considered as limiting the scope of the invention.

Example 1

Formulation and Manufacture of Edible Films of Chitosan and Gelatin

The edible films, innocuous polymeric thin layers which are applied on the surface of salmon fillets, were manufactured following this protocol: film-forming solutions were prepared (matrix polymers and plasticizers mixture), then these solutions were filtered and de-gasified. They were poured into Petri plates, then dried and finally they were conditioned to 70% of relative humidity until reaching a stable mass to obtain the desired films. In a first step, different concentration levels of polymers and plasticizers were used for the film-forming solutions (Table 1.1), different drying temperatures were used (4° C., 15° C. and 30° C.) and the mechanical, thermal and structural properties of the obtained films were analyzed. For the analysis of the mechanical properties resistance to the traction, elongation percentage and the Young module of the films were determined using a texturometer (Stable Micro Systems Ltd., England). The thermal properties of the edible films were determined by Differential Scanning Calorimetry (DSC) with a DSC2920 equipment (TA Instruments, USA) and the structural properties through Scanning Electron Microscopy (SEM) using an Amray 18301 equipment (SemTech Solutions, USA).

TABLE 1

Levels of concentration of polymers and plasticizers for the formation of edible films. The remaining percentage for each level corresponds to water.

| Compound | Low level (% mass) | Medium level (% mass) | High level (% mass) |
|---|---|---|---|
| Gelatin (polymer) | 1.35% | 2.30% | 3.30% |
| Chitosan (polymer) | 0.90% | 1.55% | 2.20% |
| Glycerol (plasticizer) | 0.34% | 0.58% | 0.83% |
| D-sorbitol (plasticizer) | 0.34% | 0.58% | 0.83% |

Those films prepared with a medium level of mass concentrations and dried at 30° C. showed mechanical properties very close to the optimal values of literature (Krochta & Mulder-Johnston, 1997). The relationship between the mechanical properties and the composition of polymers (glycerol+gelatin) for the different drying temperatures are shown in FIG. 1.1.

Regarding the thermal properties of edible films, similar thermograms for each one of the films manufactured with different concentrations of polymers and plasticizers and dried at different temperatures were obtained. These thermograms indicate that the glass transition temperature (Tg) of the dried film (the water was previously evaporated) has a value close to 70° C. Also, they indicate a complete interaction between the compounds conforming the film, since independent peaks are not observed. FIG. 1.2 shows for example the thermogram of the film manufactured with a medium level of concentration of polymers and plasticizers and dried at 30° C.; this film presents optimal mechanical properties.

Regarding the analysis of the structural properties of the films, the images obtained by scanning electron microscopy (SEM) show the formation of homogeneous edible films and with regular surfaces for the different evaluated conditions (concentration levels and drying temperatures).

FIG. 1.3 shows for example the image corresponding to the film manufactured with a medium level of concentrations of polymers and plasticizers and dried at 30° C.

Likewise, the effects of using various plasticizers in the mechanical, thermal and structural properties of edible films manufactured with gelatin and chitosan were analyzed. For that, the film-forming solutions were prepared with fixed concentrations of gelatin (2.3% mass), chitosan (1.5% mass) and plasticizer (glycerol, sorbitol or mixtures thereof; 1.16% mass). Then, the mechanical properties of each film were measured (the resistance to the traction, percentage of elongation and Young module), thermal properties (by DSC) as well as their structural properties (through SEM), using the same equipment described above. These results were published in the Carbohydrate Polymers journal (Palma et al., 2016).

In addition, the water vapor permeability of the films manufactured with different plasticizers was measured; this parameter allows the determination of the amount of water, which passes through them in a determined time (a lower permeability is related with the preservation of the organoleptic properties of the food to which the film is applied). For the measurements, the methodology described in Gennadios et al. (1994) was used.

The results for the water vapor permeability of the films manufactured with different plasticizers are shown in FIG. 1.4.

Example 2

Evaluation of Edible Films with Thyme Essential Oil

The coating was applied with a basal formulation (0.8% in dry weight of TEO) to five fresh salmon fillets (average weight of 1.3 kg) using a brush, directly in the processing plant, located in Quellón, Chile, under temperature and operating conditions of the production line. Then, these fillets and another five more uncoated fillets (control) were individually stored in polyethylene bags; they were treated in a cooling tunnel (installed in the production line of the plant) at −32° C. for 12 minutes and arranged in Styrofoam boxes with gel-packs. These boxes were sent to Santiago, Chile in a refrigerated truck and stored in the Laboratory of the DIQB-PUC at temperatures close to 2° C. for later use. Finally, the fillets were subjected to microbiological, pH, color and TVN (total volatile nitrogen) analyses for 21 days.

The results of the microbiological, color and TVN analyses are shown in FIG. 2.1, FIG. 2.2 and Table 2.1, respectively. FIG. 2.1 shows that the coating used (formulation with 0.8% in dry weight of TEO) slows the growth of microorganisms from day 0 (when the coating was just applied), which would validate the hypothesis that the coating (FFS) extends the shelf life of the salmon fillets. However, none of the fillets (control and with FFS) reaches the minimum level of shelf life required by the industry and the salmons market (which is 15 days, without considering the use of ozone in the production line), since both exceed $10^6$ CFU/g of flesh, several days before reaching 15 days. Even so, the fillet with FFS does it between days 11 and 13 of storage, three or four days after the control fillet.

Regarding the measurements of pH (FIG. 2.2), even though there are some variations, it shows an increase of the pH for control fillets and with FFS toward the end of the storage period, which is consistent with the deterioration thereof. This increase is clearer when homogenized samples are analyzed (FIG. 2.2b), which include the surface and the internal flesh of the fillet (the solid sample includes only the surface). Comparing the fillets with FFS and the control, we observed that the first presents lower values of pH, which indicates that the decomposition process was retarded by using coating.

Regarding the color measurements (FIG. 2.3) there are not significant differences in brightness (L* parameter, FIG. 2.3a) comparing the fillets with FFS and control during the storage time. There are no significant differences in the values of either the a* parameters (intensity in the red-green range) and b* parameters (intensity in the yellow-blue range) (FIGS. 2.3b and 2.3c). This would indicate that the coating does not generate perceptible changes in the appearance of the salmon fillet.

Regarding the values of TVN (Table 2.1) of the fillets with FFS and control, they are maintained under 25 mg $N_2$/100 g of flesh (allowed limit according to Giménez et al. (2002)) during the storage time. Comparing the fillets with FFS and the control, we observed that the values of TVN for the first one are slightly lower, which would indicate that the coating retards the generation of nitrogen compounds associated with the flesh decomposition.

TABLE 2.1

Values of TVN in mg $N_2$/100 g of flesh for coated and uncoated (control) salmon fillets.

| Day | Coated fillet (0.8% in dry weight of TEO) | Control fillet |
| --- | --- | --- |
| 7 | 20.4 | 21.5 |
| 13 | 18.4 | 19.6 |
| 20 | 21 | 21.3 |

Example 3

Evaluation of Edible Films with Thyme Essential Oil, Carvacrol and Thymol

Three coatings were evaluated following the same procedure as indicated in EXAMPLE 2:

FFS A: 2.5% in dry weight of TEO and 600 ppm of pure carvacrol (bioactive compound purchased from Sigma Aldrich)

FFS B: 2.5% in dry weight of TEO, 300 ppm of pure carvacrol and 300 ppm of pure thymol (additional bioactive compound also purchased from Sigma Aldrich)

FFS C: 2.5% in dry weight of TEO, 600 ppm of pure carvacrol and 300 ppm of pure thymol.

In this case, analyses were performed in AquaGestion Laboratory. As shown in FIG. 3.1, the use of the FFS B and FFS C formulations significantly retard the microbiological growth after 14 days of storage (values of CFU/g of meet close to $10^6$).

Subsequently, the test assessed the effect of the coating with FFS-C formulation over the shelf life of fresh salmon fillets previously disinfected with ozone (in concentrations close to 1 ppm). The application of the coating is carried out by aspersion (using hydro-pneumatic atomization nozzle in EXAMPLE 2) and bath in a plastic bag; both methods could be installed in the production line located in Quellón, Chile. The microbiological analyses were carried out in the corresponding days following the methodology of counting mesophyll aerobic microorganisms RAM of the Official Chilean Standard 2659 (2002) (the same used in previous steps of this project) and under the conditions established by AquaGestion. Said method consists in making serial dilutions of the samples (in this case, coated and uncoated fillet pieces) to then sow these dilutions in plates with culture media and measure the colony-forming units (CFU) which exist per gram of sample (CFU/g). All the microbiological analysis tests were performed in triplicate.

From the first days of storage at 0° C., the coating used (FFS-C formulation) retards the growth of microorganisms in the fresh salmon fillets treated with ozone, independent of the application method used (aspersion or bath in plastic bag of packaging) (FIG. 3.2). This effect is clearly observed during the first 8 days of storage, period in which the differences of microbiological content between the control samples and the coated samples are notorious. Comparing the application methods of the coating, the results show that there are no statistically significant differences between the effects of both on the microbiological growth of the fillets.

However, on average, the application method of coating by bath in plastic bag of packaging generates the best results.

Example 4

Carvacrol Encapsulation

Particles of alginate and carvacrol were fabricated using ionic gelling, with either a syringe to form the particles or by spray. Afterwards, these particles are incorporated to the composition of the present invention.

Average size: The average size of particles varied in function of their type, where syringe-produced particles had the greater size (Table 4.1).

TABLE 4.1

| Particle Type | Average size (μm) | % Load capacity |
|---|---|---|
| Alginate (IG, syringe) | 453 ± 64 | 46.64 ± 7.9 |
| Alginate (IG, spray) | 108 ± 31 | 5.68 ± 0.3 |
| Alginate-chitosan | 84 ± 24 | 3.47 ± 0.5 |
| Chitosan-TPP | 63 ± 12 | 2.36 ± 0.7 |

Carvacrol load capacity: Syringe-produced particles showed higher % load, whereas the other particles showed a significantly lower load capacity. These results are related to the size of particles, smaller particles have lower carvacrol percentage load capacity.

This could impose an important disadvantage, since smaller particles can perform better without affecting organoleptic properties of the product. Nevertheless, a small particle has a big disadvantage, since the percentage load capacity is much lower than bigger particles, i.e. above 400 μm.

Release rate under controlled conditions: carvacrol release was determined using high-performance liquid chromatography. With a calibration curve, the concentration of carvacrol can be determined.

Release rates were evaluated, showing that the particle size is determinant in the release of carvacrol. If particle size is too small, then the release rate cannot be controlled since carvacrol is released instantly. Bigger particles, such as the ones obtained using syringe-IC, showed a controlled release of carvacrol, maintaining a relatively constant release rate that provides the antimicrobial effects.

Example 5

Evaluation of Antimicrobial Resistance (AMR) of the Composition of the Present Invention The antimicrobial activity of the composition of the present invention was evaluated. Aerobic mesophylls count was performed on salmon fillets that had the application of the different formulations mentioned in this invention. Each formulation corresponded to a specific type of polymeric film, incorporating thyme essential oil and/or carvacrol, either free or encapsulated. The formulations are shown in Table 5.1.

TABLE 5.1

Treatment Formulations

| | Treatments | Available Carvacrol* (g/100 g) |
|---|---|---|
| C1 (Control 1) | Untreated salmon fillets | 0.0 |
| C2 (control 2) | Edible Coating (EC) | 0.0 |
| T1 | EC + 1% free carvacrol + 0.25% carvacrol MC + 0.25% TEO MC | 1.15 |
| T2 | EC + 1.15% free carvacrol | 1.15 |
| T3 | EC + 2.55% carvacrol MC | 1.15 |
| T4 | EC + 8.50% TEO MC | 1.15 |

*Bioactive compound
EC: base film (chitosan-gelatin), Edible Coating
MC: Microcapsules
EO: Thyme Essential Oil Each of the treated samples was stored in hermetic polyethylene bags in a refrigerated system at 2±1° C. Triplicate samples were taken on days 2, 9, 16, 23 y 30 of storage. Microbial count was performed using AMR standard method for food products, and a critical threshold was established at $1 \times 10^6$ CFU/g.

T1: Bioactive film model (invention). The antimicrobial capacity was standarized as a function of the carvacrol content. Based on this the film has the following carvacrol concentration in a 100 gr of FFS:

Free carvacrol: 1 g/100 gr FFS

Carvacrol capsules: 0.25 g/100 g FFS, providing 0.1125 g of carvacrol (the capsule has a loading capacity of 45% in weight).

TEO capsules: 0.25 g/100 g FFS, providing 0.034 g of carvacrol (the capsule has a loading capacity of 45% in weight, and the TEO has a carvacrol content of 30%)

In total this film provides 1.15 g of carvacrol per 100 g of FFS.

T2: Corresponds to a film with the same carvacrol concentration of model T1, but in free form (1.15 g of free carvacrol per 100 g of solution).

T3: Corresponds to a film with the same carvacrol concentration of model T1, but with encapsulated carvacrol only (2.55 g of encapsulated carvacrol per 100 g of solution). Because the encapsulated carvacrol capsules have a loading capacity of 45%, the film provides 1.15 g of carvacrol per 100 g of solution.

T4: Corresponds to a film with the same carvacrol concentration of model T1, but with encapsulated TEO. This film has 8.5 g of encapsulated TEO per 100 g of solution (1.15 g of carvacrol per 100 g of solution).

T1, T2, T3 and T4 have different compositions, but they have equivalent amounts of carvacrol.

Microbial growth results for salmon fillets treated are shown in FIG. 4.1. In the case of control samples C1 (untreated fillets), there was a progressive and statistically significant increase in microbial count in days 9 and 16, reaching the critical limit before day 16 ($10^6$ CFU/g), reaching even counts of $10^7$ CFU/g. Salmon with such high microbial counts are not suitable for consumption. For the case of the second control C2 (fillets with coating and without active antimicrobial agents), unlike C1, there were no statistical significant differences between day 2 and 9, which would suggest that there is a certain bacteriostatic control exerted, probably by the chitosan present in the composition, which has been shown to have some antimicrobial properties. On day 16 the microbial growth is significantly greater, reaching the critical limit of $10^6$ CFU/g, thus, a shelf-life of less than 2 weeks (14 days) can be inferred. It was found that on day 23, the microbial count had a significant decrease maintaining microbial counts in the range of $10^5$ CFU/g. This unexpected result could be produced by a residual effect of the chitosan diluting over the fillet, generating an antimicrobial effect as solubilization progresses. Afterwards, on day 30, the microbial counts increase again reaching the critical limit, and even reaching over $10^7$ CFU/g.

For the treatments using the composition including bioactive compounds, carvacrol and/or thyme essential oil, in all cases there was an appropriate control of aerobic mesophylls (FIG. 4.2). On day 9, all treatments had a count around $10^3$ CFU/g, and even treatment T2 reached only $10^2$ CFU/g. Nevertheless, no statistical differences were found among treatments for day 9. On day 16 there was a significant count increase compared to day 9, and this was observed in all treatments, although no significant differences among treatments were found for day 16.

Treatments T2 and T3 are close to the critical limit on day 16; nevertheless, on day 23, treatment T2, containing free carvacrol, showed a significant effect in reducing microbial load, lowering the counts to $10^4$ CFU/g, significantly increasing shelf-life in terms of bacterial load. On the other hand, on day 16 for treatments T1 and T4, samples showed counts around $10^4$ CFU/g, i.e. 100 times lower than treatments T2 and T3, although no significant differences were found between T2 and T3.

Up to day 23, treatments T1, T2, and T4 resulted significantly better in the control of microbial growth, with no statistical differences among them, but with statistically significant differences compared to the controls and treatment T3.

On day 30, all treatments had a microbial load over the established critical limit. The results show that the composition of the present invention significantly reduces microbial load, and the shelf-life is increased to at least 3 weeks (21 days).

Example 6

Evaluation of Differentials in Microbial Loads Rates

To evaluate the synergic effects of the bioactive compounds, the film T1 was used as a model. The antimicrobial effect was compared to the control C1 (salmon without any treatment) in terms of the microbial growth. The same comparison was made between C1 and T2, and T3 and T4. This procedure was determined in day 23, given that it is the maximum time at which the microbial growth is at the critical limit ($1 \times 10^6$ CFU/g).

To evaluate the existance of synergic effects, a comparison between T1 and the average of T2, T3 and T4 was calculated. This procedure was determined for day 23.

| Control (C1) AMC (Log CFU/g) | Treatment AMC (Log CFU/g) | Differential C1 (AMC) − Tn(AMC) |
|---|---|---|
| 7.14 | C2: 5.09 | 2.05 |
| 7.14 | T1: 3.65 | 3.49 |
| 7.14 | T2: 4.33 | 2.81 |
| 7.14 | T3: 5.58 | 1.56 |
| 7.14 | T4: 4.23 | 2.91 |

Since carvacrol concentration is the same in each composition, only varying the way it is present, either free and/or encapsulated, the following relation is met:

T1=T2=T3=T4, since total carvacrol concentration is 1.15%. Nevertheless, since the way it is present varies, this could represent synergic or antagonistic effects.

If the differentials behave as either of the following options, a synergic effect is shown, which is related to the way carvacrol is present in the composition:

T1>T2

T1>T3

T1>T4

For all the evaluated cases, the composition of the present invention resulted in a better antimicrobial activity than each of the alternative treatments. Nevertheless, these effects must be evaluated in function of weighing of each of the active compounds disposition, compared to the composition of the present invention.

Thus:

$\Delta T1 X_1 = \Delta T2 X_2 + \Delta T3 X_3 + \Delta T4 X_4$   $\Delta = \text{Log}_{10}$ differential microbial growth $3.49 X_1 = 2.81 X_2 + 1.56 X_3 + 2.91 X_4$   $X_n$=component fraction (active agent, free or encapsulated)

$X_1$=1: All components fraction $X_2+X_3+X_4=1$

Wherein:

$X_2$=free carvacrol fraction, compared to the composition of the present invention $X_3$=encapsulated carvacrol fraction, compared to the composition of the present invention $X_4$=encapsulated TEO fraction, compared to the composition of the present invention Considering these factors, and calculating the carvacrol content, as 100 gram product base:

1.15 g=1.0 g free carvacrol+0.25 g encapsulated carvacrol+0.25 g encapsulated TEO Percental ratios:

1.15 g→1.15 g carvacrol→100%

1.00 g→1.00 g carvacrol→86.9%

0.25 g→0.25×0.45 (% load)=0.11 g carvacrol→9.6%

0.25 g→0.25×0.45 (% load)×0.30 (% carvacrol into TEO)=0.03 g→2.6%

Then, $X_2$=0.869 (Fraction of T2 with respect to T1)

$X_3$=0.096 (Fraction of T3 with respect to T1)

$X_4$=0.026 (Fraction of T4 with respect to T1)

Given that the films T2, T3 and T4 have the same bioactive concentration, but arranged differently, the weighted summation of each of them corresponds to T1

Therefore:

$3.49 X_1 = 2.81 X_2 + 1.56 X_3 + 2.91 X_4$ 3.49 (1)=2.81(0.869)+1.56(0.096)+2.91(0.026)

3.49=2.44+0.15+0.08

3.49>2.67

Thus, the composition of the present invention can reduce the microbiological load; the fillets treated with this invention, when compared to untreated fillets (C1) showed a microbiological load that was 10 times greater than the sum of the individual components. This demonstrates that there is no additive effect among the components of the composition of the present invention, but rather an unexpected synergic effect.

The mechanism of action of the film is due to the way the bioactive agent is found in the film. Specifically, 87% of the total carvacrol contained in the coating is free and uniformly distributed over the entire surface of the film. This acts directly and quickly on the microorganisms by direct contact, which generates a shock effect. However, the effect of free carvacrol is short-lived due to its rapid volatilization. On the other hand, encapsulated carvacrol, which represent 12.5% of the total bioactive in the film, has a much slower migration, because these compounds must migrate from inside the capsule to the film and from there to the surface of the flesh; therefore, it has persistence over time. The sum of the effect of the free carvacrol and the encapsulated carvacrol allows the film to have an immediate effect and a persistent effect with a longer-term effect. The synergy of these effects is determinant in the control of microbial growth and the increase of the shelf life of fileted salmon.

INDUSTRIAL APPLICABILITY

The present invention can be applied in the food processing industry, more particularly for preserving fresh food, more specifically meat, fish, poultry, vegetables, among others.

The invention claimed is:

1. A composition that can form an edible film or an edible liquid coating that can be applied to the surface of fresh fish (fillets or cuts) or fresh seafood, comprising:
   a. a film-forming solution, comprising chitosan, gelatin, a surfactant, and, optionally, a plasticizer; and
   b. at least one active agent, comprising carvacrol and, optionally, thyme essential oil; oregano essential oil; rosemary essential oil; thymol; cinnamaldehyde; cineol; and/or eugenol;
wherein the thyme essential oil, oregano essential oil, rosemary essential oil, thymol, cinnamaldehyde, cineol, and/or eugenol, if present, is present as free active agents and/or particles of encapsulated active agents,
wherein the carvacrol is present as free active agents and as particles of encapsulated active agents.

2. The composition according to claim 1, wherein the particles of encapsulated active agents have an average size from 350 μm to 450 μm.

3. The composition according to claim 1, wherein the chitosan is present in a concentration from 1.0% w/w to 3.0% w/w.

4. The composition according to claim 1, wherein the gelatin is present in a concentration from 1.5% w/w to 3.5% w/w.

5. The composition according to claim 1, wherein the at least one active agent is present in a concentration from 0.12% w/w to 1.5% w/w.

6. The composition according to claim 5, wherein the at least one active agent comprises the carvacrol and the thyme essential oil and the at least one active agent is present in a concentration from 0.12% w/w to 1.0% w/w.

7. The composition according to claim 5, wherein the at least one active agent is present in a concentration from 0.12% w/w to 1.0% w/w.

8. The composition according to claim 2, wherein the encapsulated active agents are present in a concentration from 0.25% w/w to 1.0% w/w.

9. The composition according to claim 8, wherein the encapsulated active agents are carvacrol and are present in a concentration from 0.25% w/w to 1.0% w/w.

10. The composition according to claim 1, wherein the encapsulated active agents are encapsulated using ionic gelling.

11. The composition according to claim 1, wherein the encapsulated active agents are encapsulated using physical, physico-chemical, or chemical techniques.

12. The composition according to claim 1, wherein the film-forming solution comprises 1-5% w/w of the chitosan and 1-5% w/w of the gelatin.

13. The composition according to claim 12, wherein the film-forming solution further comprises the plasticizer.

14. The composition according to claim 13, wherein the plasticizer comprises 1-5% w/w sorbitol or 1-5% w/w glycerol.

15. The composition according to claim 1, wherein the film-forming solution comprises 0.01-0.1% w/w of the surfactant.

* * * * *